(12) United States Patent
Yamamoto et al.

(10) Patent No.: US 9,616,622 B2
(45) Date of Patent: Apr. 11, 2017

(54) RTM METHOD

(71) Applicant: Toray Industries, Inc., Tokyo (JP)

(72) Inventors: Kohnosuke Yamamoto, Nagoya (JP);
Seiji Tsuji, Nagoya (JP); Kazuya Watanabe, Nagoya (JP)

(73) Assignee: Toray Industries, Inc. (JP)

(*) Notice: Subject to any disclaimer, the term of this patent is extended or adjusted under 35 U.S.C. 154(b) by 281 days.

(21) Appl. No.: 14/380,083

(22) PCT Filed: Feb. 21, 2013

(86) PCT No.: PCT/JP2013/054348
§ 371 (c)(1),
(2) Date: Aug. 21, 2014

(87) PCT Pub. No.: WO2013/125641
PCT Pub. Date: Aug. 29, 2013

(65) Prior Publication Data
US 2015/0048546 A1    Feb. 19, 2015

(30) Foreign Application Priority Data
Feb. 22, 2012    (JP) .................................. 2012-036085

(51) Int. Cl.
*B29C 70/48*    (2006.01)
*B29C 45/02*    (2006.01)
(Continued)

(52) U.S. Cl.
CPC .............. *B29C 70/48* (2013.01); *B29C 45/02* (2013.01); *B29C 45/14786* (2013.01);
(Continued)

(58) Field of Classification Search
CPC . B29C 45/14786; B29C 70/48; B29C 70/546; B29C 45/02; B29C 45/22
See application file for complete search history.

(56) References Cited

U.S. PATENT DOCUMENTS

| 6,063,315 A * | 5/2000 | Keller ................. B29C 45/1704 264/40.1 |
| 2004/0018265 A1* | 1/2004 | Miller ..................... B29C 45/53 425/129.1 |
| 2007/0182071 A1* | 8/2007 | Sekido ................. B29C 33/0066 264/511 |

FOREIGN PATENT DOCUMENTS

| JP | 2003-053744 A | 2/2003 |
| JP | 2003-071856 A | 3/2003 |

(Continued)

OTHER PUBLICATIONS

Lundstrom, T.S and B.R. Gebart, Influence from Process Parameters on Void Formation in Resin Transfer Molding, Polymer Composites, vol. 15, No. 1 (Feb. 1994), pp. 25-33.*

(Continued)

*Primary Examiner* — Matthew Daniels
(74) *Attorney, Agent, or Firm* — DLA Piper LLP (US)

(57) ABSTRACT

An RTM method in which a preform formed from a reinforcing fiber substrate is placed in a cavity of a molding die, and resin is injected from a plurality of injection ports into the cavity and impregnated into the preform, includes disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions.

13 Claims, 6 Drawing Sheets

(51) Int. Cl.
    *B29C 45/14*     (2006.01)
    *B29C 45/16*     (2006.01)
    *B29C 45/22*     (2006.01)
    *B29C 70/54*     (2006.01)
    *B29K 105/08*     (2006.01)
    *B29L 9/00*     (2006.01)

(52) U.S. Cl.
    CPC .......... *B29C 45/1671* (2013.01); *B29C 45/22* (2013.01); *B29C 70/546* (2013.01); *B29K 2105/0872* (2013.01); *B29L 2009/00* (2013.01)

(56) References Cited

FOREIGN PATENT DOCUMENTS

| | | |
|---|---|---|
| JP | 2005-246902 A | 9/2005 |
| JP | 2006-095727 A | 4/2006 |
| JP | 2007-144994 A | 6/2007 |
| WO | 2012/115067 A1 | 8/2012 |

OTHER PUBLICATIONS

Johnson, M.S., C.D. Rudd, and D.J. Hill, Microwave assisted resin transfer moulding, Composites Part A, vol. 29A (1998), pp. 71-86.*
Kang, M.K., J.J. Jung, W.I. Lee, Analysis of resin transfer moulding process with controlled multiple gates resin injection, Composites: Part A, vol. 31 (2000), pp. 407-422.*

* cited by examiner

RTM METHOD

TECHNICAL FIELD

This disclosure relates to an RTM (Resin Transfer Molding) method and, specifically, to improvement of an RTM method which injects resin from a plurality of injection ports into a cavity.

BACKGROUND

An RTM method, in which a preform formed from a reinforcing fiber substrate is placed in a cavity of a molding die, and resin is injected from a plurality of injection ports into the cavity and impregnated into the preform, is well known. For example, in JP-A-2005-246902, a method wherein resin is injected simultaneously from a plurality of injection ports disposed inside a product area of an article to be molded relative to a fiber reinforcing substrate placed in a cavity, a so-called "multi-point" injection method, is disclosed. Further, in JP-A-2007-144994, a molding method, wherein seal portions that control resin flow are provided on both sides of the direction in which resin flows and resin is injected from the side of the periphery part of a cavity, is disclosed.

Figure 1:
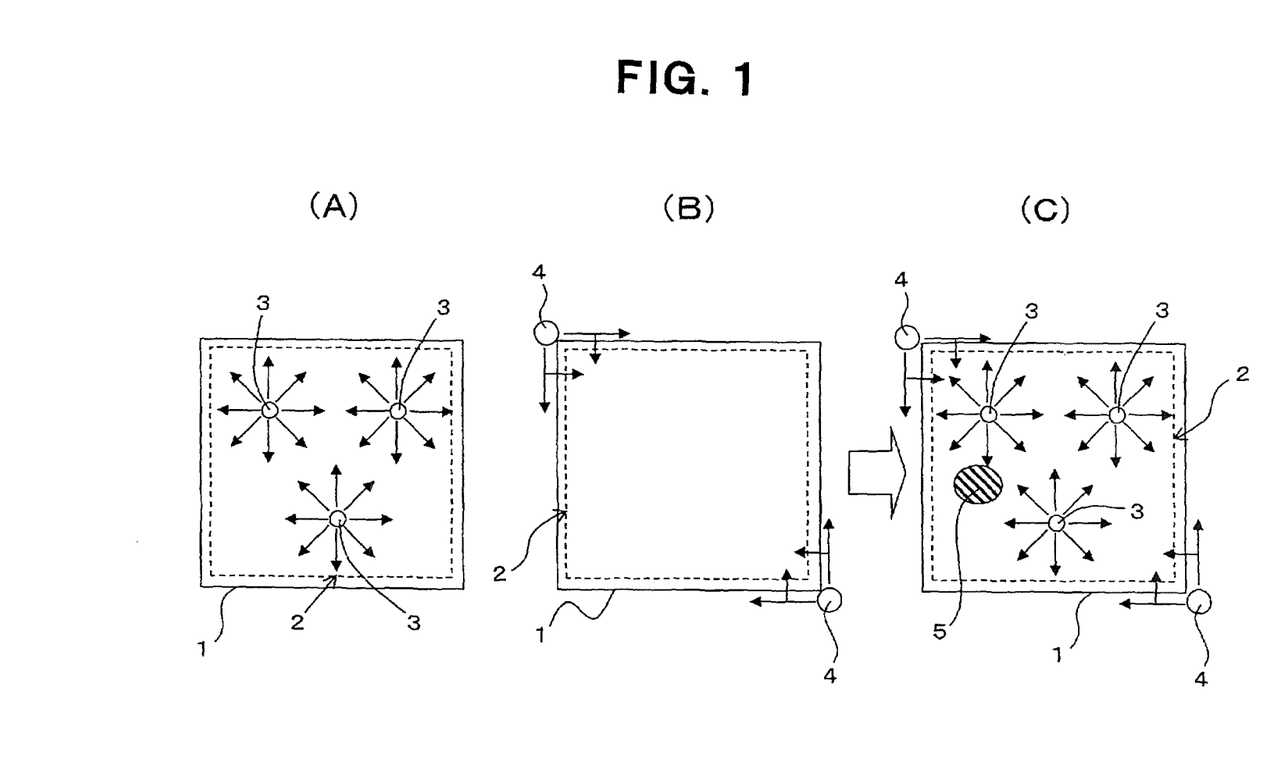
FIGS. 1(A)-(C) show simulated diagrams showing resin injection manners for explaining problems to be solved.

In the above-described multi-point injection method such as disclosed in JP '902, for example, as shown in FIG. 1(A), although resin (shown by arrows) is injected from a plurality of injection ports 3 disposed within an area of a product line 2 of an article to be finally molded relatively into a preform formed from a reinforcing fiber substrate, there is a problem that it requires a relatively long time for the distribution of the resin from the respective injection ports 3 to the whole of the preform 1 and the resin impregnation is slow. Further, in the method such as disclosed in JP '994 in which resin is injected from the side of the periphery part of a cavity, for example, as shown in FIG. 1(B), although resin (shown by arrows) is injected into the preform 1 from injection ports 4 disposed at the side of the periphery part of the preform 1, there is also a problem that it requires a relatively long time for the distribution of the resin from the respective injection ports 4 to the whole of the preform 1 and the resin impregnation is slow.

To solve the problems in the methods shown in FIGS. 1(A) and 1(B), although it is considered to combine the both methods, for example, as shown in FIG. 1(C), by merely combining them, the resin impregnation into the preform 1 becomes faster, but there is a possibility that a sink mark accompanying curing of the resin may occur at a section 5 located within the area of the product line 2 of an article to be finally molded, in particular, at a section at which the resin flow from the injection port 3 and the resin flow from the injection port 4 collide with each other and the like, and there is a fear that such a sink mark may damage the quality of the molded article. Further, by merely combining both methods, with respect to resin flow to improve resin impregnation into a molded product, a resin flow positively utilizing the periphery-side part cannot be realized, rather in JP '994, a seal portion is provided to obstruct the positive flow along the periphery.

Further, in JP-A-2003-71856, although an RTM method indicating a temperature during molding as a parameter is shown, an attempt to positively control a temperature distribution in a die is not described. Namely, it does not positively provide resin impregnation at a high velocity, and it also does not simultaneously address resin impregnation at a high velocity with an improvement in quality of a molded article.

Accordingly, there is a need for resin impregnation at a high velocity with simultaneous improvement in quality of a molded article that has not been achieved in conventional technologies to an RTM method that injects resin from a plurality of injection ports.

SUMMARY

We provide an RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions.

We also provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein the injection ports disposed in the first positions are closed prior to the injection ports disposed in the second positions.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a temperature of resin injected from the injection ports disposed in the first positions is higher than a temperature of resin injected from the injection ports disposed in the second positions.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein a resin injection flow rate or injection pressure at an injection initial stage is reduced before completion of resin filling into the preform.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein resin pressure is applied to an interior of the cavity from the injection ports disposed in the second positions or a pressure supply source disposed near the injection ports even after resin is impregnated into the preform.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein resin pressure applied to an interior of the cavity from the injection ports disposed in second positions or a pressure supply source disposed near the injection ports is enhanced after completion of resin injection from the injection ports disposed in the second positions.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein resin is injected into the cavity which is reduced in pressure beforehand.

We also provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein the injection ports disposed in the first positions are closed prior to the injection ports disposed in the second positions, and wherein a temperature of resin injected from the injection ports disposed in the first positions is higher than a temperature of resin injected from the injection ports disposed in the second positions.

We also provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein the injection ports disposed in the first positions are closed prior to the injection ports disposed in the second positions, and wherein a resin injection flow rate or injection pressure at an injection initial stage is reduced before completion of resin filling into the preform.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be different from each other between injection ports disposed in the first positions and injection ports disposed in the second positions, wherein a temperature of resin injected from the injection ports disposed in the first positions is higher than a temperature of resin injected from the injection ports disposed in the second positions, and wherein a resin injection flow rate or injection pressure at an injection initial stage is reduced before completion of resin filling into the preform.

We also provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein the injection ports disposed in the first positions are closed prior to the injection ports disposed in the second positions, and wherein resin pressure is applied to an interior of the cavity from the injection ports disposed in the second positions or a pressure supply source disposed near the injection ports even after resin is impregnated into the preform.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a temperature of resin injected from the injection ports disposed in the first positions is higher than a temperature of resin injected from the injection ports disposed in the second positions, and wherein resin pressure is applied to an interior of the cavity from the injection ports disposed in the second positions or a pressure supply source disposed near the injection ports even after resin is impregnated into the preform.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a resin injection flow rate or injection pressure at an injection initial stage is reduced before completion of resin filling into the preform, and wherein resin pressure is applied to an interior of the cavity from the injection ports disposed in the second positions or a pressure supply source disposed near the injection ports even after resin is impregnated into the preform.

We also provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein the injection ports disposed in the first positions are closed prior to the injection ports disposed in the second positions, and wherein resin pressure applied to an interior of the cavity from the injection ports disposed in the second positions or a pressure supply source disposed near the injection ports is enhanced after completion of resin injection from the injection ports disposed in the second positions.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a temperature of resin injected from the injection ports disposed in the first positions is higher than a temperature of resin injected from the injection ports disposed in the second positions, and wherein resin pressure applied to an interior of the cavity from the injection ports disposed in the second positions or a pressure supply source disposed near the injection ports is enhanced after completion of resin injection from the injection ports disposed in the second positions.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a resin injection flow rate or injection pressure at an injection initial stage is reduced before completion of resin filling into the preform, and wherein resin pressure applied to an interior of the cavity from the injection ports disposed in the second positions or a pressure supply source disposed near the injection ports is enhanced after completion of resin injection from the injection ports disposed in the second positions.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein resin pressure is applied to an interior of the cavity from the injection ports disposed in the second positions or a pressure supply source disposed near the injection ports even after resin is impregnated into the preform, and wherein resin pressure applied to an interior of the cavity from the injection ports disposed in the second positions or a pressure supply source disposed near the injection ports is enhanced after completion of resin injection from the injection ports disposed in the second positions.

We also provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein the injection ports disposed in the first positions are closed prior to the injection ports disposed in the second positions, and wherein resin is injected into the cavity which is reduced in pressure beforehand.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a temperature of resin injected from the injection ports disposed in the first positions is higher than a temperature of resin injected from the injection ports disposed in the second positions, and wherein resin is injected into the cavity which is reduced in pressure beforehand.

We further provide the RTM method in which a preform formed from a reinforcing fiber substrate is placed in a cavity of a molding die, and resin is injected from a plurality of injection ports into the cavity and impregnated into the preform, including disposing the plurality of injection ports in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and causing the timing of closing the injection ports after resin injection to be difference from each other between injection ports disposed in the first positions and injection ports disposed in the second positions, wherein a resin injection flow rate or injection pressure at an injection initial stage is reduced before completion of resin filling into the preform, and wherein resin is injected into the cavity which is reduced in pressure beforehand.

EXPLANATION OF SYMBOLS

1: preform
2: product line
3, 4: injection port
5: section located within area of product line
11: preform
12: product line
13: injection port in central section
14: injection port at periphery
21: molding device
22: cavity
23: molding die
24: upper die
25: lower die
26: press mechanism
27: preform
28: resin supply path
29, 30: pin-like valve body
31: seal material
41: cavity
42: injection port at periphery
43: injection port in central section
44: flow path at periphery
45: preform
46, 47: flow front

48: seal line
49: area proceeding with curing
50: area cured
51: area proceeding with curing

DETAILED DESCRIPTION

We provide an RTM method in which a preform formed from a reinforcing fiber substrate is placed in a cavity of a molding die, and resin is injected from a plurality of injection ports into the cavity and impregnated into the preform, is characterized in that the plurality of injection ports are disposed in first positions in a central section of the cavity corresponding to positions of the preform located in a product area of an article to be finally molded and second positions located in a periphery of the cavity corresponding to positions of the preform outside the product area of the article to be finally molded or corresponding to positions inside the cavity but outside an area of the preform, and the timing to close the injection ports after resin injection is different from each other between injection ports disposed in the first positions and injection ports disposed in the second positions.

In such an RTM method, since resin is injected from both the injection ports disposed in the first positions in the central section of the cavity and injection ports disposed in the second positions located in the periphery of the cavity, the resin impregnation into the preform is performed in a short period of time and resin impregnation at a high velocity can be achieved. Then, since the timing of closing the injection ports after resin injection is different from each other between the injection ports disposed in the first positions and the injection ports disposed in the second positions, the resin, which has been injected from the side of the injection ports closed first and which has been distributed to a certain region, is liable to be cured relatively early, and at that time, a sink mark due to curing shrinkage is likely to be caused. However, the resin, injected from the side of the injection ports which have not been closed yet, is supplemented to this part which is likely to cause a sink mark and, consequently, occurrence of the above-described sink mark due to the curing shrinkage can be suppressed or prevented. By suppression or prevention of occurrence of the sink mark, the quality of a molded article can be improved. As a result, the resin impregnation at a high velocity and an improvement in quality of a molded article can be both achieved. Moreover, since it is avoided that final impregnation positions when resin is injected only from an outer circumferential flow path, are collected finally to a point in a product, a displacement of fibers of the preform caused by the collection can be suppressed. Further, to the contrary, when flow in the central section is managed, because the resin flow itself operates, for example, in case of a woven fabric, in a direction extending reinforcing fibers forming the preform from the inside toward the outside, by switching the flow to the flow from the periphery at an adequate timing, the displacement of fibers can be appropriately suppressed. Although the criterion causing the displacement of fibers depends upon the material structure of the preform, the effect of suppressing displacement of fibers can be expected by properly applying our methods.

In the above-described RTM method, as the timing of closing the injection ports after resin injection, in particular, it is preferred that the injection ports disposed in the above-described first positions are closed prior to the injection ports disposed in the above-described second positions. By this, the resin which has been injected from the injection ports disposed in the first positions and impregnated into the central section of the preform corresponding to the central section of the cavity, is liable to be cured earlier and, at that time, a sink mark accompanying with curing shrinkage is likely to be caused. However, the resin, being injected from the injection ports disposed in the second positions and not having been closed yet, is sufficiently supplemented relative to that part, and occurrence of the sink mark can be efficiently suppressed or prevented. Namely, the flow of the injected resin from the periphery side is positively utilized, and the quality of a molded article can be improved.

Further, in the above-described RTM method, it is also preferred that the temperature of the resin injected from the injection ports disposed in the above-described first positions is controlled to be higher than the temperature of the resin injected from the injection ports disposed in the above-described second positions. In such a method, it becomes possible to concentrate final sink marks accompanying with curing shrinkage of resin to the periphery side, and it becomes possible to realize a product form in which a sink mark does not occur more securely in the central section of a molded article which is required with design property. In particular, it is a particularly effective method when a part to be outside a product area of a finally molded article is set at a periphery of a preform and the part is removed from the molded article after molding.

Further, in the above-described RTM method, it is also preferred that, to suppress displacement of fibers, the resin injection flow rate or injection pressure at an injection initial stage is reduced before completion of resin filling into the preform. Since at a final resin impregnation position, a flow front becomes small, the pressure is liable to be rapidly elevated and the risk causing the displacement of fibers becomes high, by applying our methods in such a manner, it becomes possible to suppress the displacement of fibers.

Further, it is also preferred to apply a resin pressure to an interior of the cavity from the injection ports disposed in the above-described second positions or a pressure supply source disposed near the injection ports even after resin is impregnated into the preform. In such a manner, for example, when there exists resin which has been injected from the injection ports disposed in the first positions and which is impregnated into the central section of the preform corresponding to the central section of the cavity and is liable to be cured earlier, because the resin pressure is to be applied from the outer circumferential side of that section, it is prevented that that section becomes a negative pressure accompanying curing of the resin, and occurrence of a sink mark accompanying curing shrinkage is also avoided.

Further, it is also preferred to apply a resin pressure to an interior of the cavity from the injection ports disposed in the above-described second positions or a pressure supply source disposed near the injection ports and is enhanced after completion of resin injection from the injection ports disposed in the second positions. In such a manner, similar to the above-described manner, when there exists resin which has been injected from the injection ports disposed in the first positions and which is impregnated into the central section of the preform corresponding to the central section of the cavity and is liable to be cured earlier, the resin at that section is likely to be flowed accompanying curing shrinkage. However, relative to this resin flow at the time of curing shrinkage, resin can be supplied and supplemented from the outer circumferential side intentionally and efficiently, and occurrence of a sink mark accompanying with curing shrinkage can be suppressed or prevented.

Further, it is preferred that, although not particularly restricted, as the method of injecting resin into the cavity from the plurality of injection ports, a method is employed wherein the interior of the cavity is reduced in pressure beforehand and the resin is injected into the cavity reduced in pressure. In such a method, it becomes possible to impregnate resin satisfactorily into every part of the preform over the wide range of the preform.

Thus, by injecting resin from both the injection ports disposed in the first positions in the central section of the cavity and injection ports disposed in the second positions located in the periphery of the cavity, resin impregnation into the preform at a high velocity can be achieved and, by adequately differentiating the timings for closing the injection ports after resin injection between both the injection ports, occurrence of a sink mark accompanying with curing shrinkage at the time of curing of the injected resin can be suppressed or prevented, and by suppressing displacement of fibers of the preform causing during resin flow, improvement of the quality of a molded article can be achieved at the same time.

Hereinafter, examples of the present invention our methods will be explained referring to the figures.

Figure 2:
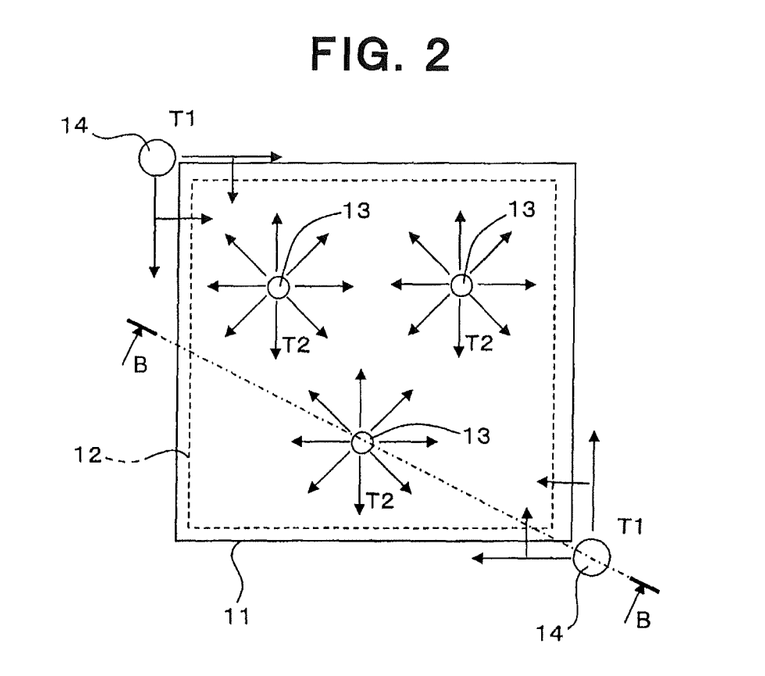
FIG. 2 is a simulated diagram showing an RTM method according to an example.

FIG. 2 shows an example of our RTM methods. In FIG. 2, symbol 11 indicates a preform formed from a reinforcing fiber substrate which is placed in a cavity of a molding die of a molding device as described later using FIG. 3, and symbol 12 indicates a product line showing a product area of an article to be finally molded in the preform 11. In this example, resin is injected from a plurality of injection ports into a cavity and impregnated into the preform 11, and the plurality of injection ports comprise injection ports 13 (three injection ports 13 are depicted) disposed in first positions located in a central section (that is, positions in the central section) of a cavity (exemplified in FIG. 3) corresponding to positions located in a product area (positions within an area defined by the product line 12) of an article to be finally molded in the preform 11, and injection ports 14 (two injection ports 14 are depicted) disposed in second positions located in the periphery (that is, positions in the periphery) of the cavity corresponding to positions inside the cavity but outside an area of the preform 11. As aforementioned, the injection ports 14 of the periphery side can also be disposed corresponding to positions located outside the product area of an article to be finally molded in the preform 11 (that is, located in the region between the outline of the preform 11 and the product line 12 in FIG. 2). As the injected resin in the RTM method, a thermoplastic resin can also be employed other than a thermosetting resin.

The resin injected form the respective injection ports 13 disposed in the above-described central section is distributed from each injection port 13 radially in a circle-like form as shown by the arrows in the figure, and impregnated into the preform 11. Further, the resin injected form the respective injection ports 14 disposed in the periphery flows along the outer circumference of the preform 11 and flows toward the inside of the preform 11, and it is impregnated from the periphery side of the preform 11 toward the central section thereof. T1 in the figure indicates the temperature of the resin injected from the injection port 14, and T2 indicates the temperature of the resin injected from the injection port 13, respectively. The time to close the injection ports after resin injection is different from each other between injection ports 13 disposed in the central section and injection ports 14 disposed in the periphery. In particular, as shown in Table 1 and FIGS. 4 to 6 described later, it is preferred to close the injection ports 13 disposed in the central section prior to the injection ports 14 disposed in the periphery.

Except such a condition that the timing of closing the injection ports after resin injection is different from each other between injection ports 13 disposed in the central section and injection ports 14 disposed in the periphery, for example, the following conditions are preferably employed. They will be explained similarly referring to FIG. 2. For example, by controlling the temperatures of the resin at a condition of $T1<T2$, it becomes possible to concentrate final sink marks to the periphery side. Further, when the injected resin is a thermosetting resin, there is a possibility that it is not necessary to consider a weld line which is likely to be generated at a collision part of the resin from the injection ports 13 and the resin from the injection ports 14. Further, when vacuum molding in which resin is injected into a cavity reduced in pressure beforehand is carried out, there is a possibility that it becomes unnecessary to consider occurrence of voids at a joining part of the resins from both injection ports.

Further, if the part from the injection port 14 to, for example, the preform 11 is set at a distance of the thickness of a molded article or less, a waste resin amount after molding can be reduced. Furthermore, when using a high-reactive resin, the thickness of a resin-only part is reduced, and an effect of suppressing reduction of pot life due to self-exothermic reaction can also be expected. Further, it also becomes possible to suppress the influence to a region in a molded product due to exothermic reaction and the like at the temperature T1 part. Moreover, when the molding temperature is high, for example, if the resin injection pressure from the injection port 14 is controlled to become higher after completion of the resin injection, it becomes possible to suppress occurrence of sink marks.

To suppress displacement of fibers which may be caused in the preform 11, it is also effective and preferred to reduce the flow rate of the resin or the injection pressure at a time before completion of resin filling (85 to 99% of the complete filling amount). Because, at a final impregnation point, the flow front becomes small and the pressure is liable to elevate rapidly, and the risk of causing displacement of fibers also becomes high.

As another method of suppressing the above-described displacement of fibers, raised is a method of making the flow in the central section a dominant flow as compared to the flow at the periphery. Occurrence of displacement of fibers originates from the flow directed from the periphery to the central section, and in the flow directed from the central section to the periphery, it is hardly caused because the direction of the flow becomes a direction to extend the fiber arrangement of the preform. Therefore, our methods can also be utilized to suppress displacement of fibers.

Further, it is also preferred to apply a resin pressure only with respect to injection from the injection ports 14 after completion of impregnation. In such a manner, when the part in the product area and in the central section is higher in temperature than T1 and is cured more early, because the part in the product area does not become a negative pressure at the time of being cured, it becomes possible to suppress occurrence of a sink mark of a molded article. Further, as a method of applying the resin pressure from a part except the above-described injection ports 14, the function of a die or a press machine may be substituted.

Further, if pressure is being applied from the periphery side, it becomes possible to efficiently perform resin supply which is required accompanying with resin flow at the time of curing shrinkage of resin.

Figure 3:
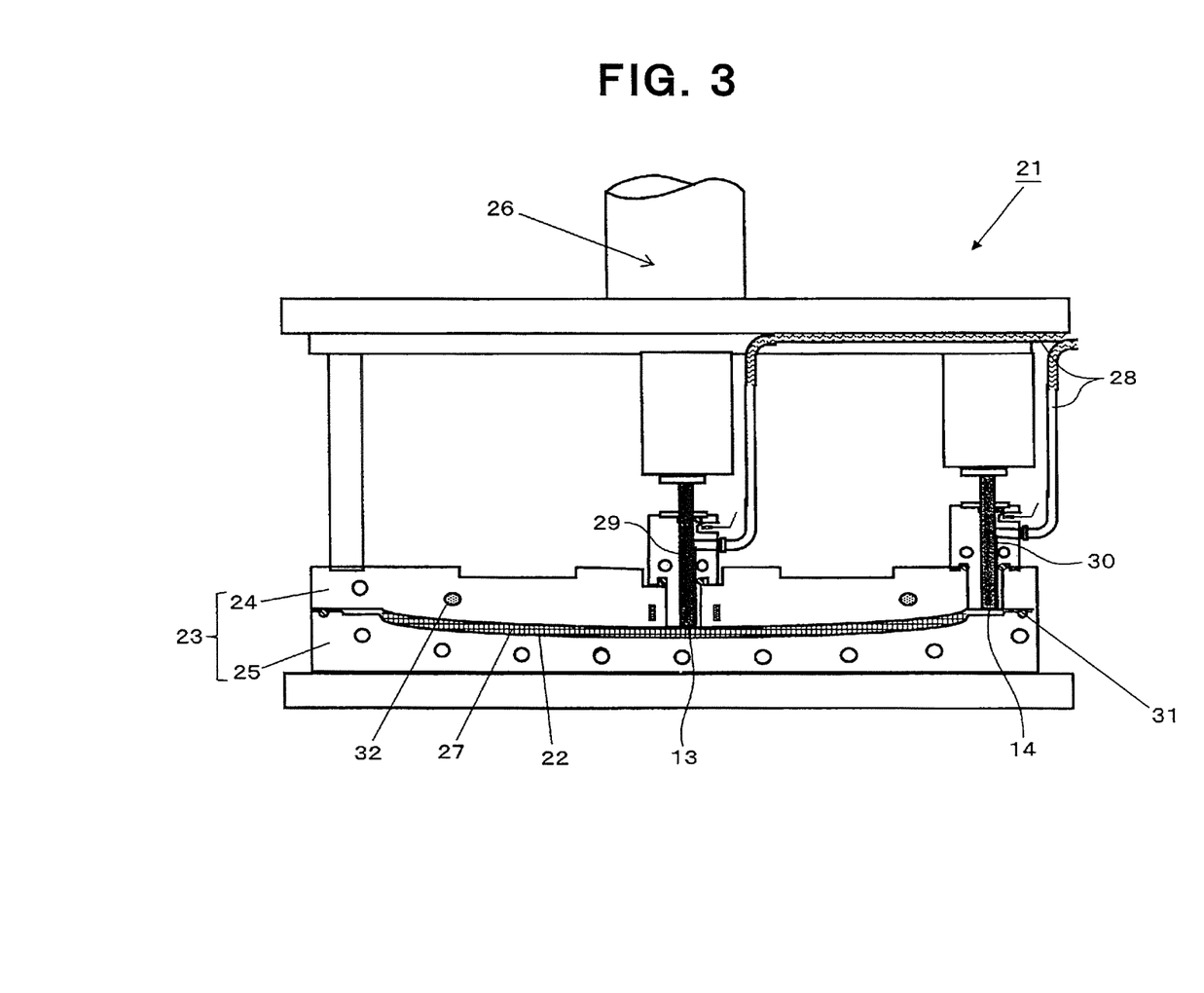
FIG. 3 is a schematic vertical sectional view of a molding device showing an example of a vertical section as viewed along B-B line of FIG. 2.

The above-described resin injection is carried out, for example, using an RTM molding device such as one shown in FIG. 3. FIG. 3 is exemplified as a vertical sectional view of a molding device showing an example of a vertical section as viewed along B-B line of FIG. 2. A molding device 21 exemplified in FIG. 3 has an upper die 24 and a lower die 25 as a molding die 23 to form a cavity 22, and the upper die 24 acts to open and close the mold by a press mechanism 26. In the cavity 22, a preform 27, for example, which comprises a stacked body of reinforcing fiber substrates and which is formed in a predetermined shape in advance, is placed. At a condition where this preform 27 is placed in the cavity 22, the upper die 24 is closed relative to the lower die 25, resin is supplied from a resin supply path 28, and the resin is injected from a plurality of injection ports 13, 14 into the cavity 22 and impregnated into the preform 27. The injection ports 13, 14 are opened and closed, for example, by pin-like valve bodies 29, 30, and the circumference of the cavity 22 is sealed by a seal material 31. The molding die 23 is heated and cooled, for example, by a heat medium communicated through a heat medium communication path 32, it is heated to achieve a good resin impregnation at the time of resin injection, and after the resin impregnation, it is cooled (cooling by natural heat radiation is also possible) and the injected and impregnated resin is cured, and a predetermined FRP molded article is manufactured.

The timing of the respective operations from injection start of resin, stop, up to curing of resin, can be carried out, for example, as shown in Table 1 as Standard 1, Standard 2 and Standard 3. In the item of Temperature in Table 1, the description, that "Outer to Inside" is "0 to −ΔT," means that the temperature in the central section (inside the product area) is relatively low by ΔT as compared with the temperature at the periphery.

the flow of the resin injected from the injection ports 42 at the periphery is carried forward.

Soon, as shown in FIG. 4(C), although resin injection of a substantially necessary amount is completed and the condition reaches a flow stop condition in which the resin has been impregnated over the entire region of the preform 45, even at that time, the injection ports 42 at the periphery are left at the opened conditions, and whereby, the pressure of the resin injected from the injection ports 42 at the periphery is applied from the periphery side (Flow stop (1)). By aforementioned, occurrence of a sink mark can be suppressed, and lack of supplied resin accompanying with resin flow in the region inside a product can also be prevented.

Then, as shown in FIG. 4(D), curing of the resin progresses first from the region of the central section of the preform 45 (an area 49 which is progressing in curing), at that step, the injection ports 42 at the periphery having been opened are closed, and all the flow of the injected resin is stopped (Flow stop (2)). At the condition shown in FIG. 4(D), curing of the resin is carried forward over the entire region of the preform 45, and the molding is completed.

Although in Standard 2 the operations are carried forward as shown in FIG. 5(A) to (D), they will be explained using the same symbols as those shown in FIG. 4. In Standard 2, although the operation shown in FIG. 5(A) is carried forward at the same conditions as those shown in FIG. 4(A), in the operation shown in FIG. 5(B), as compared to the operation shown in FIG. 4(B), the injection ports 43 in the central section are left open, and the flow front 46 as the tip of resin flow into the preform 45 is further carried forward. Soon, as shown in FIG. 5(C), although the condition reaches the same condition as that shown in FIG. 4(C), because the injection ports 43 in the central section are not closed in the operation shown in FIG. 5(B) as described above, the resin

TABLE 1

| | Standard 1 | | | Standard 2 | | | Standard 3 | | |
|---|---|---|---|---|---|---|---|---|---|
| | Injection port | | | Injection port | | | Injection port | | |
| | Periphery | Central section | Temperature Outer to Inside | Periphery | Central section | Temperature Outer to Inside | Periphery | Central section | Temperature Outer to Inside |
| Injection start | Open | Open | 0 to −ΔT | Open | Open | 0 to −ΔT | Open | Open | 0 to −ΔT |
| During flow | Open | Close | 0 to −ΔT | Open | Open | 0 to −ΔT | Open | Open | 0 to −ΔT |
| Flow stop (1) | Open | Close | | Open | Close | 0 to −ΔT | Open | Close | 0 to −ΔT |
| Flow stop (2) | Close | | | Close | | 0 to −ΔT | Open | | 0 to −ΔT |
| During curing | | | | | | | Close | | |

In Standard 1, as shown in FIG. 4(A), resin injection into a cavity 41 from injection ports 42 at the periphery and injection ports 43 in the central section is started (the injection operations are shown by black circle marks), the resin injected from the injection ports 42 at the periphery is caused to flow up to the interior of a preform 45 (symbol 45 indicates the end of the preform) through a flow path 44 at the periphery to form a flow front 46 as the tip of the flow. The resin injected from the injection ports 43 in the central section is caused to flow and spread in a circle-like form to form a flow front 47 as the tip of the flow. Symbol 48 indicates a seal line to obstruct resin flow to a part outside a predetermined area.

The resin injection and flow from the respective injection ports are carried forward and, then, as shown in FIG. 4(B), only the injection ports 43 in the central section are closed first (closing of injection port is indicated by x mark), and injection and impregnation into a necessary region of the preform 45 is completed earlier as compared to that in Standard 1. The conditions for the operations shown in FIGS. 5(C) and (D) are substantially same as the conditions for the operations shown in FIGS. 4(C) and (D).

Although in Standard 3 the operations are carried forward as shown in FIG. 6(A) to (E), they will be explained using the same symbols as those shown in FIG. 5. In Standard 3, as compared to the operations of Standard 2 shown in FIG. 5, as shown in FIG. 6(D), at the stage of Flow stop (2) the injection ports 42 at the periphery are left open, and the pressure of the injected resin therefrom is more enhanced. Then, by this increase of the resin pressure, occurrence of sink marks, which may be caused by the curing shrinkage of the resin in the preform 45, is sufficiently obstructed, and the resin supplement, which may be possibly required accompanying with resin flow, is satisfactorily performed from the periphery side. As shown in FIG. 6(E), the area 49 proceeding with curing in FIG. 6(D) changes to an area 50 cured, the remaining area becomes an area 51 proceeding with curing, and at that condition, the injection ports 42 at the periphery are closed. The conditions for the operations shown in FIG. 6(A) to (C) are substantially same as the conditions for the operations shown in FIG. 5(A) to (C).

Figure 4:
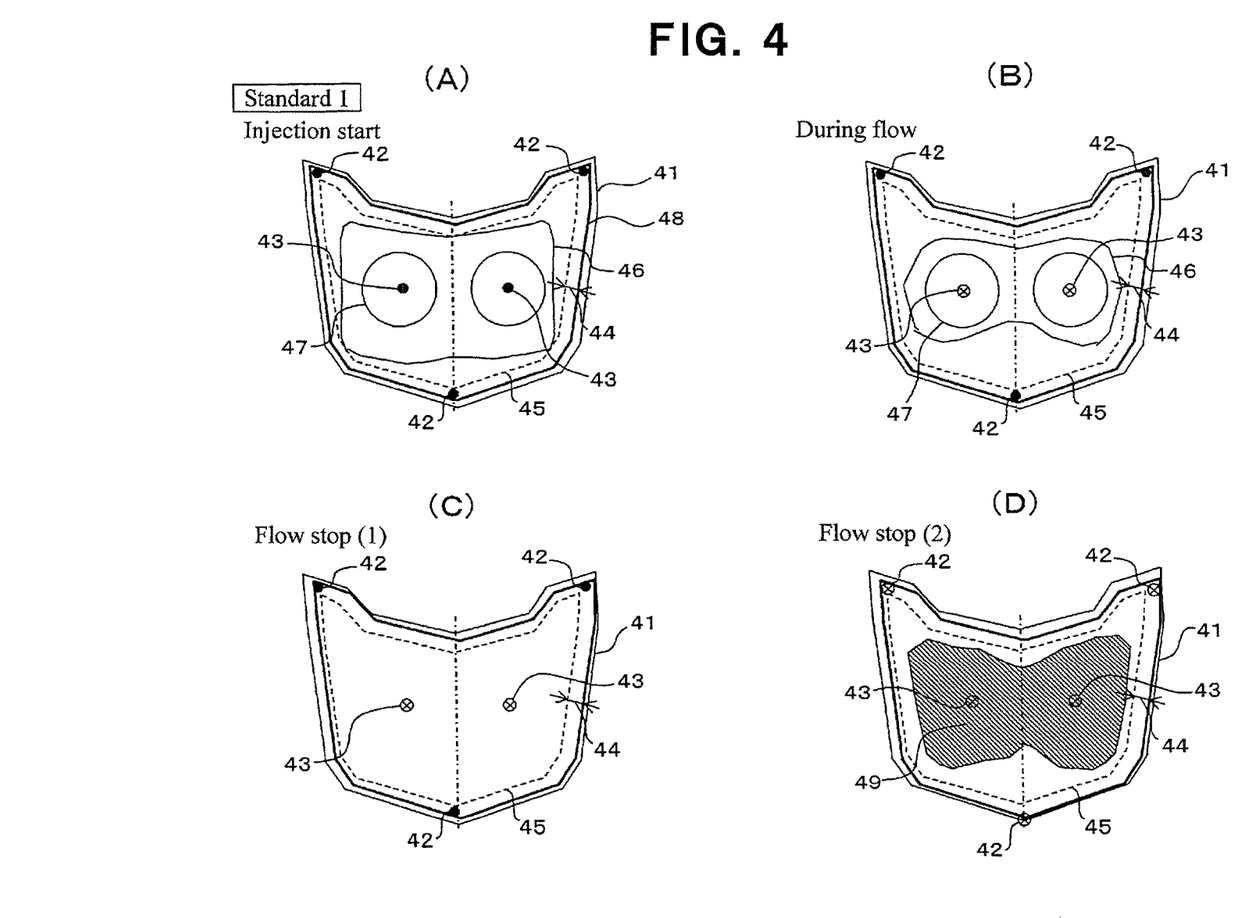
FIGS. 4(A)-(D) show step diagrams showing an example (Standard 1) of an RTM method.
Figure 5:
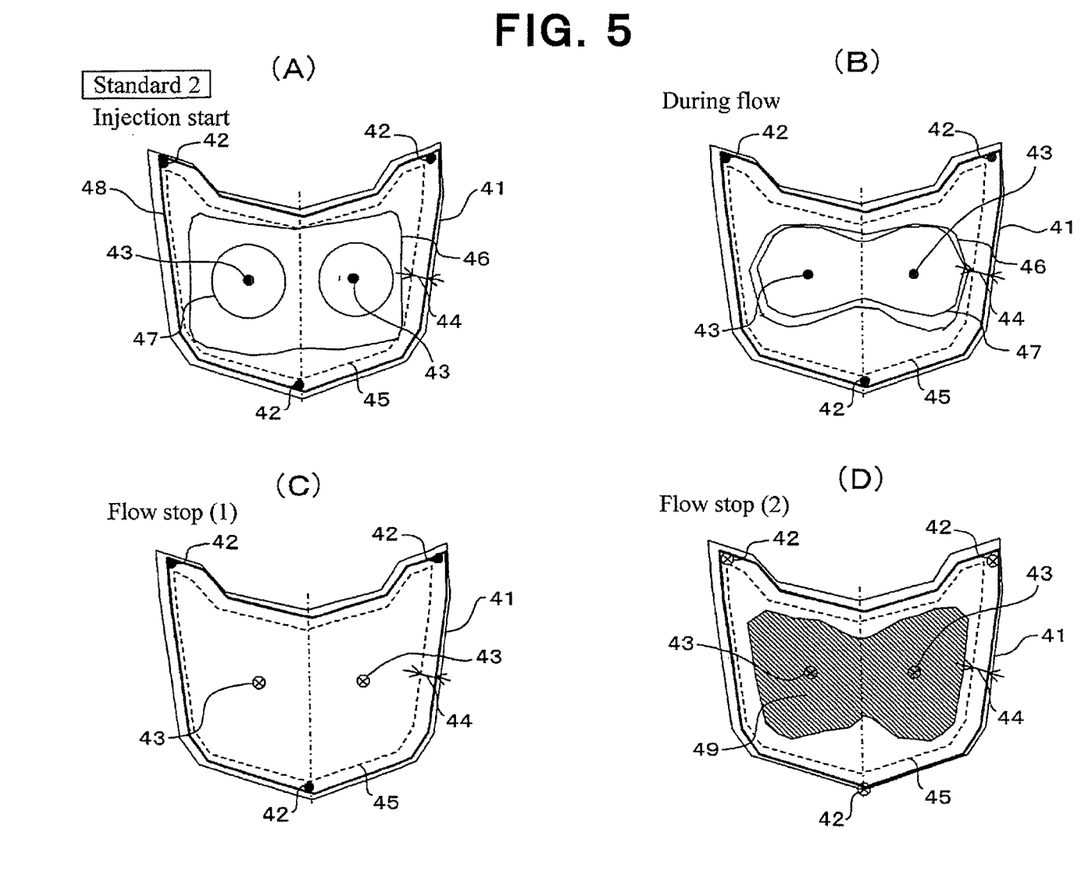
FIGS. 5(A)-(D) show step diagrams showing another example (Standard 2) of an RTM method.
Figure 6:
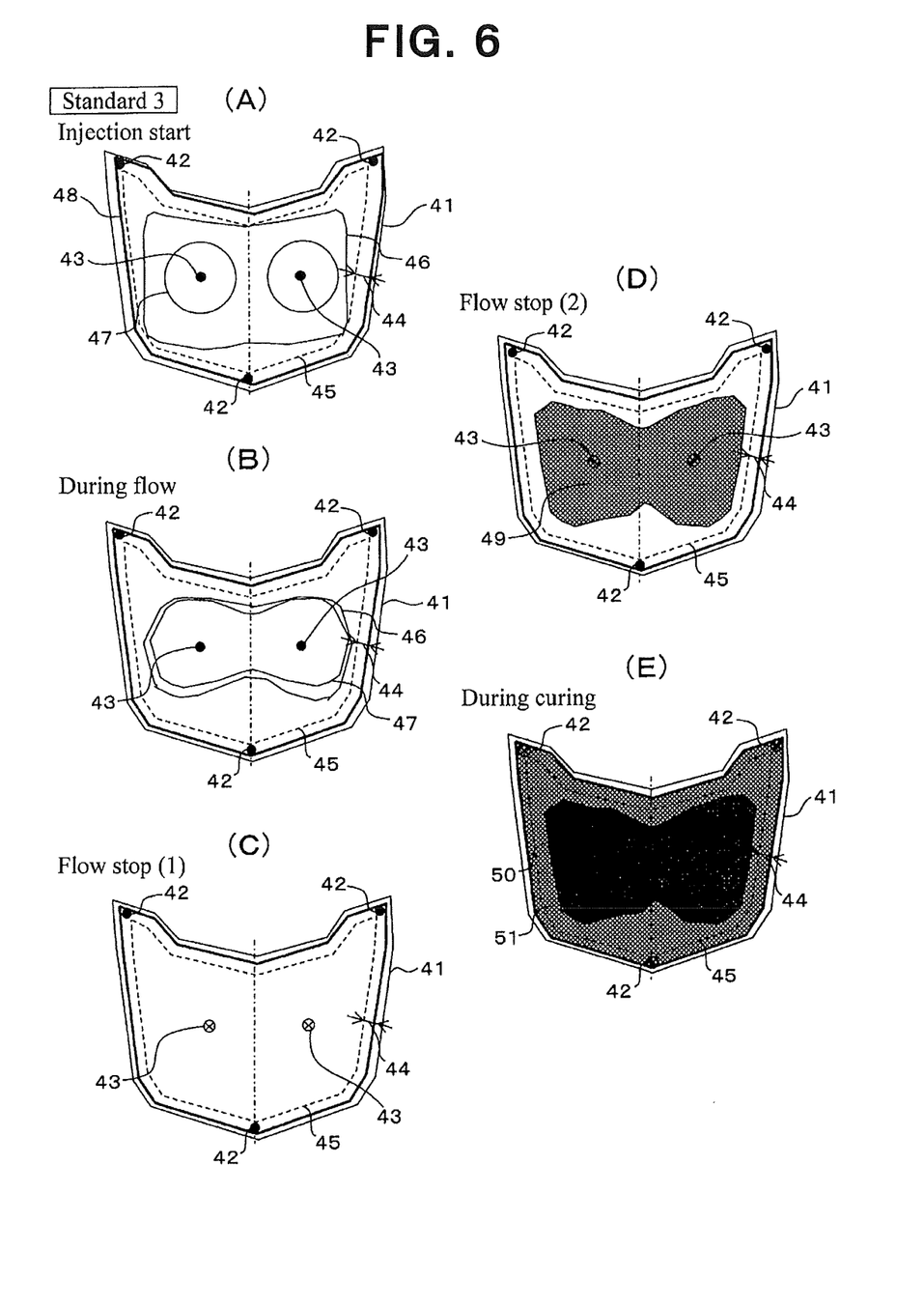
FIGS. 6(A)-(E) show step diagrams showing a further example (Standard 3) of an RTM method.

As exemplified in the above-described FIGS. 4 to 6, various conditions can be employed for the timing of closing the injection ports 42 at the periphery and the injection ports 43 in the central section.

In any Standard, increase of pressure after resin injection from the injection ports is desirable to improve the surface quality of a molded article. However, when disturbance of the weave structure of a reinforcing fiber substrate is caused at a position directly below an injection port, it is preferred to decrease the pressure at a part immediately after injection, Further, if conditions capable of realizing fast impregnation are employed, high-cycle production (mass production) becomes possible. With respect to the time for injection and time for curing, when the same resin is cured at the same temperature, the ratios of the injection time and the curing time are almost the same. Although the time can be shortened by increasing the pressure, if the pressure is increased too much, disturbance of the fibers is liable to occur, for example, with respect to the injection from the periphery, because disturbance of the end of the preform is caused, the end cannot be used as a product and, therefore, it is necessary to prepare a larger preform. However, this is not applied when a part to be wasted is required to exist at the periphery.

INDUSTRIAL APPLICATIONS

Our RTM methods can be applied to any molding of an FRP (Fiber reinforced Plastic) required with achievement of both of resin impregnation at a high velocity and improvement in quality of a molded article.

The invention claimed is:

1. An RTM method in which a preform formed from a reinforcing fiber substrate is placed in a cavity of a molding die, and resin is injected from a plurality of injection ports into said cavity and impregnated into said preform, comprising:

disposing the plurality of injection ports in first positions in a central section of said cavity corresponding to positions of said preform located in a product area of an article to be finally molded and second positions located in a periphery of said cavity corresponding to positions of said preform outside said product area of said article to be finally molded or corresponding to positions inside said cavity but outside an area of said preform, wherein curing of the resin progresses first from a region of a central section of the preform to a peripheral section of the preform; and causing the timing of closing said injection ports after resin injection to be different from each other between injection ports disposed in said first positions and injection ports disposed in said second positions, said injection ports disposed in said first positions being closed prior to said injection sorts disposed in said second positions, and said injection ports disposed in said second positions being closed after curing of the resin in the central section of the preform and during curing of resin in the peripheral section of the preform.

2. The RTM method according to claim 1, wherein a temperature of resin injected from said injection ports disposed in said first positions is higher than a temperature of resin injected from said injection ports disposed in said second positions.

3. The RTM method according to claim 2, wherein resin pressure is applied to an interior of said cavity from said injection ports disposed in said second positions or a pressure supply source disposed near said injection ports even after resin is impregnated into said preform.

4. The RTM method according to claim 2, wherein resin pressure applied to an interior of said cavity from said injection ports disposed in said second positions or a pressure supply source disposed near said injection ports is enhanced after completion of resin injection from said injection ports disposed in said second positions.

5. The RTM method according to claim 2, wherein resin is injected into said cavity which is reduced in pressure beforehand.

6. The RTM method according to claim 1, wherein a resin injection flow rate or injection pressure at an injection initial stage is reduced before completion of resin filling into said preform.

7. The RTM method according to claim 6, wherein resin pressure is applied to an interior of said cavity from said injection ports disposed in said second positions or a pressure supply source disposed near said injection ports even after resin is impregnated into said preform.

8. The RTM method according to claim 6, wherein resin pressure applied to an interior of said cavity from said injection ports disposed in said second positions or a pressure supply source disposed near said injection ports is enhanced after completion of resin injection from said injection ports disposed in said second positions.

9. The RTM method according to claim 6, wherein resin is injected into said cavity which is reduced in pressure beforehand.

10. The RTM method according to claim 1, wherein resin pressure is applied to an interior of said cavity from said injection ports disposed in said second positions or a pressure supply source disposed near said injection ports even after resin is impregnated into said preform.

11. The RTM method according to claim 10, wherein resin pressure applied to an interior of said cavity from said injection ports disposed in said second positions or a pressure supply source disposed near said injection ports is enhanced after completion of resin injection from said injection ports disposed in said second positions.

12. The RTM method according to claim 1, wherein resin pressure applied to an interior of said cavity from said injection ports disposed in said second positions or a pressure supply source disposed near said injection polls is enhanced after completion of resin injection from said injection ports disposed in said second positions.

13. The RTM method according to claim 1, wherein resin is injected into said cavity which is reduced in pressure beforehand.

* * * * *